(12) United States Patent
Beaurepaire

(10) Patent No.: US 11,100,346 B2
(45) Date of Patent: Aug. 24, 2021

(54) METHOD AND APPARATUS FOR DETERMINING A LOCATION OF A SHARED VEHICLE PARK POSITION

(71) Applicant: HERE GLOBAL B.V., Eindhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 205 days.

(21) Appl. No.: 16/232,795

(22) Filed: Dec. 26, 2018

(65) Prior Publication Data

US 2020/0210729 A1  Jul. 2, 2020

(51) Int. Cl.
*G06K 9/00* (2006.01)

(52) U.S. Cl.
CPC .............. *G06K 9/00825* (2013.01)

(58) Field of Classification Search
CPC ........... G06K 9/00671; G06K 9/00805; G06K 9/00812; G06K 9/00825; G06K 9/4604
See application file for complete search history.

(56) References Cited

U.S. PATENT DOCUMENTS

| 8,370,030 | B1 | 2/2013 | Gurin | |
| 9,689,693 | B2* | 6/2017 | Newlin | G08G 1/0141 |
| 9,949,267 | B2* | 4/2018 | Carnevale | H04W 4/023 |
| 10,755,691 | B1* | 8/2020 | Herman | G06K 9/00791 |
| 2012/0050525 | A1* | 3/2012 | Rinner | G06T 7/33 |
| | | | | 348/117 |
| 2016/0196654 | A1* | 7/2016 | Aoki | G06T 7/246 |
| | | | | 382/103 |
| 2017/0046545 | A1* | 2/2017 | Bravo Sanchez | G07B 15/02 |
| 2018/0039276 | A1* | 2/2018 | Keivan | G06T 7/74 |
| 2018/0224866 | A1* | 8/2018 | Alonso-Mora | G06N 5/04 |
| 2019/0278434 | A1* | 9/2019 | Holzer | G06F 3/0481 |
| 2020/0088390 | A1* | 3/2020 | Stegeman | F21V 21/116 |
| 2020/0120451 | A1* | 4/2020 | Liu | H04W 4/40 |
| 2020/0134747 | A1* | 4/2020 | Zhang | G06F 16/9537 |
| 2020/0149903 | A1* | 5/2020 | Beaurepaire | G08G 1/123 |
| 2020/0167702 | A1* | 5/2020 | Beaurepaire | G01C 21/3423 |
| 2020/0172189 | A1* | 6/2020 | Li | G01C 21/36 |
| 2020/0173806 | A1* | 6/2020 | Li | G06F 3/041 |
| 2020/0175429 | A1* | 6/2020 | Beaurepaire | G06N 7/005 |
| 2020/0236523 | A1* | 7/2020 | Zhang | G07C 9/00182 |

FOREIGN PATENT DOCUMENTS

| CN | 107071736 A | 8/2017 |
| CN | 107195119 A | 9/2017 |
| CN | 107424406 A | 12/2017 |
| CN | 107450087 A | 12/2017 |
| CN | 107808117 A | 3/2018 |

\* cited by examiner

*Primary Examiner* — Ian L Lemieux
(74) *Attorney, Agent, or Firm* — Ditthavong, Steiner & Mlotkowski

(57) ABSTRACT

An approach is provided for determining a location of a shared vehicle based on fused location data. The approach includes initiating a capture of an image of a shared vehicle using a camera sensor of a device. The approach also includes processing the image to determine an image-based location of the shared vehicle. The approach also includes fusing the image-based location with at least one other source of location data indicating a position of the shared vehicle to determine the location of the shared vehicle.

17 Claims, 12 Drawing Sheets

METHOD AND APPARATUS FOR DETERMINING A LOCATION OF A SHARED VEHICLE PARK POSITION

BACKGROUND

Service providers and vehicle manufacturers are continually challenged to deliver value and convenience to consumers by, for example, providing compelling network services. One area of interest has been the development of location-based services to that involve locating parked positions of shared vehicles such as bicycles, electric scooters, mopeds, cars, etc. For example, in some scenarios, when a shared vehicle is parked in a city, there is a risk that the location of this shared vehicle cannot be accurately detected with GPS, differential GPS or GPRS. This risk is due to environmental factors such as reflections on buildings, urban canyon effect, etc. Under these types of scenarios, service providers face significant technical challenges in locating the shared vehicle accurately.

SOME EXAMPLE EMBODIMENTS

Therefore, there is a need for an approach for detecting and reporting a shared vehicle's parking position so that it can be more easily located.

According to one embodiment, a method for determining a location of a shared vehicle based on fused location data, comprises initiating a capture of an image of a shared vehicle using a camera sensor of a device. The method also comprises processing the image to determine an image-based location of the shared vehicle. The method also comprises fusing the image-based location with at least one other source of location data indicating a position of the shared vehicle to determine the location of the shared vehicle.

According to another embodiment, an apparatus comprises at least one processor, and at least one memory including computer program code for one or more computer programs, the at least one memory and the computer program code configured to, with the at least one processor, initiate a capture of an image of a shared vehicle using a camera sensor of a device. The apparatus is also caused to process the image to determine an image-based location of the shared vehicle. The apparatus is also caused to fuse the image-based location with at least one other source of location data indicating a position of the shared vehicle to determine the location of the shared vehicle.

According to another embodiment, a computer-readable storage medium carries one or more sequences of one or more instructions which, when executed by one or more processors, cause, at least in part, an apparatus to initiate a capture of an image of a shared vehicle using a camera sensor of a device. The apparatus is also caused to determine an image-based location of the shared vehicle. The apparatus is also caused to fuse the image-based location with at least one other source of location data indicating a position of the shared vehicle to determine the location of the shared vehicle.

According to another embodiment, an apparatus comprises means for capturing of an image of a shared vehicle using a camera sensor of a device. The apparatus also comprises means for processing the image to determine an image-based location of the shared vehicle. The apparatus further comprises means for fusing the image-based location with at least one other source of location data indicating a position of the shared vehicle to determine the location of the shared vehicle.

In accordance with yet another embodiment, a method for facilitating use of shared vehicles provided by a shared vehicle service is disclosed. The shared vehicle service provides a plurality of users with a plurality of shared vehicles. Each of the shared vehicles is available for temporary exclusive personal usage by any of said users, whereupon after a temporary exclusive personal usage of a particular one of the plurality of shared vehicles by any of the users the particular shared vehicle is available for temporary exclusive personal usage by another of the users. The method includes obtaining an image of a shared vehicle from one of the plurality of users who has finished a usage of the shared vehicle and parked the shared vehicle along a road in a geographic area that includes a service area of the shared vehicle service. The image was obtained with a device of one of the plurality of users, wherein the image was obtained from a vantage point away from the shared vehicle and wherein the image shows the shared vehicle amid surroundings of the shared vehicle. The method includes making the image or contents thereof available to a potential subsequent user of the shared vehicle to facilitate locating or identifying the shared vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining a location of a shared vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
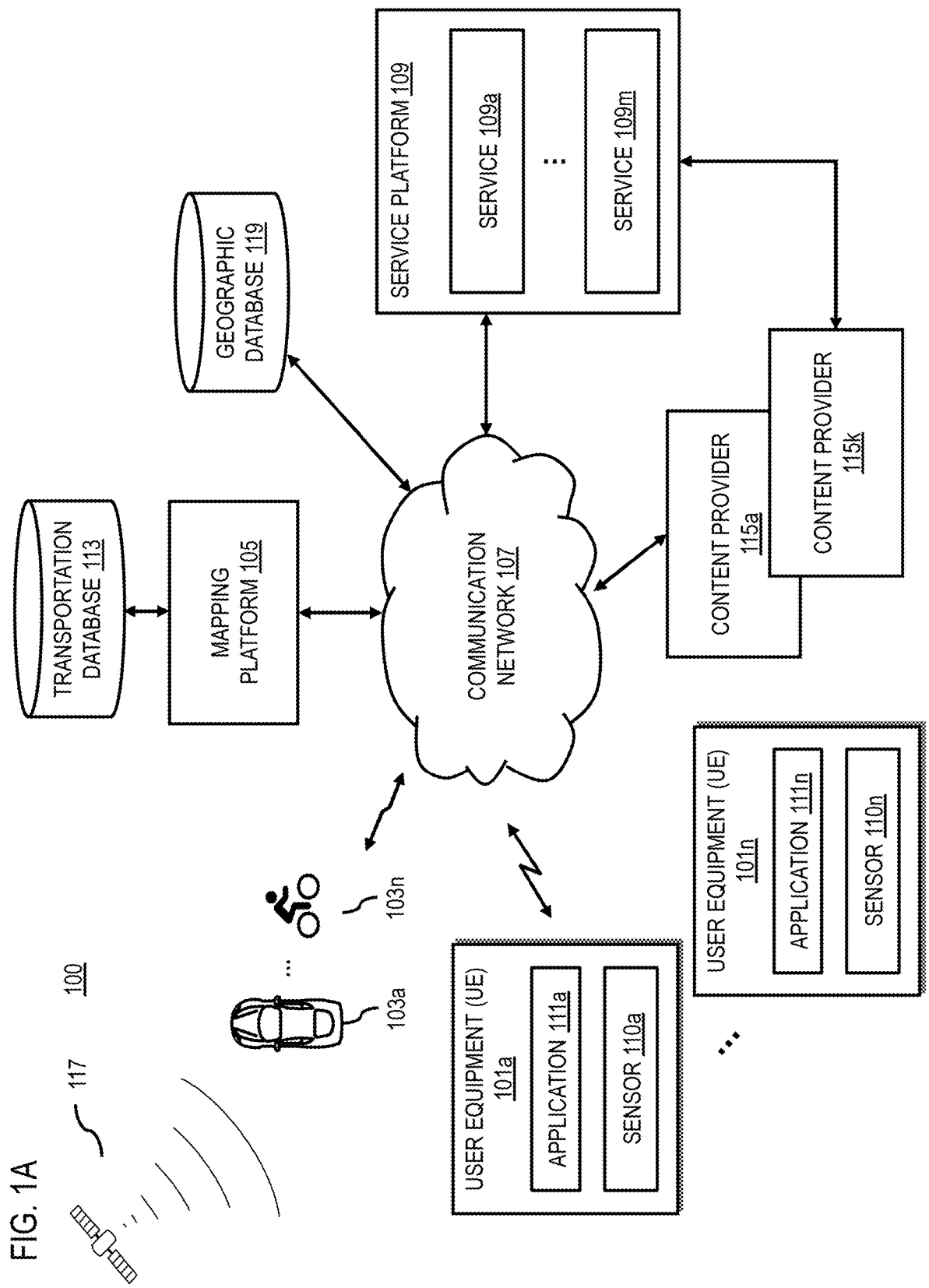
FIG. 1A is a diagram of a system for determining a location of a shared vehicle based on fused location data, according to one embodiment.

FIG. 1A is a diagram of a system for determining a location of a shared vehicle, according to one embodiment. With the emergence of shared vehicle services (e.g., shared cars, bicycles, motorcycles, boats, mopeds, scooters, etc.), the importance of obtaining an accurate position of a parked shared vehicle has also increased. A shared vehicle may be a car, a motorcycle, an electric bike, an electric scooter, a bicycle, a kickboard, a mini scooter, a boat, etc. owned by an individual, a commercial business, a public agency, a cooperative, or an ad hoc grouping. The vehicle (e.g., cars, motorcycles, electric bikes, electric scooters, bicycles, boats, airplanes, etc.) can be human-operated, semi-autonomous, or autonomous.

With a GPS approach, an upload of GPS information from an end user's mobile device can be provided when the shared vehicle is returned or checked out. With a GPRS method, the shared vehicle is equipped a GPS positioning module. In some cases, the shared vehicle such as a bicycle, moped or scooter is parked adjacent to a wall or other reflecting surface making it difficult for the GPS or GPRS to provide accurate positioning coordinates. As such, the next user of the shared vehicle can waste considerable time searching for the shared vehicle. When a next user is provided with only an approximate GPS or GPRS location, the next user has a much more difficult time trying to locate the shared vehicle which increases the next user's inconvenience and potentially reduces the next user's interest in using the shared vehicle service in the future. Similarly, at the time the shared vehicle is being checked out by the end user, there are instances when the end user is not able to check out and leave the shared vehicle because a GPS position cannot be reported. As such, the end user must move the shared vehicle to another location until a proper GPS signal can be reported. This provides an undesirable experience for the end user attempting to check out the shared vehicle. Under these types of scenarios, service providers face significant technical challenges in optimizing the parked location of shared vehicles to minimize user time spent on checking out and locating the shared vehicle and improving user experience.

By way of example, shared vehicle services generally offer a fleet of vehicles that can be "booked" or reserved for use by users. After the user has completed their trip, the shared vehicle is checked out or returned by the user, such that the next user can accurately and efficiently locate the parked shared vehicle for use. Hence, location-based solutions that provide accurate GPS positions of parked shared vehicles can a provide valuable service to consumers by minimizing the time a user spends attempting to check out or return a shared vehicle and by optimizing the user's report of accurate GPS position data back to the shared vehicle service. If a reported location of a checked out shared vehicle is not provided, or only an approximate location is reported, this causes the shared vehicle service to potentially lose money and reduce the number of customers served or the utilization rates of the shared vehicles.

However, providing accurate location details of a parked shared vehicle can be technically challenging. In particular, a common occurrence in cities is for GPS position data being only approximate for a parked shared vehicle due to environmental obstacles such as building reflections, GPS drift, urban canyon effect, etc. For example, shared vehicles such as bicycles are often parked next to walls or other reflecting surfaces. As a result, GPS position data cannot be accurately reported back to a shared vehicle service by way of a user's device. Similarly, GPRS position data cannot be reported back to the shared vehicle service by way of a positioning module or receiver equipped on the shared vehicle. The user may be forced to relocate the shared vehicle to a different location that is not subject to environmental obstacles. This delay greatly diminishes the user's experience and takes away valuable time from the user. Additionally, the user needs to pay for the time when he or she is trying to return/check out a vehicle. Moreover, the positioning module on the shared vehicle is an added cost for the shared vehicle service provider in terms of the module's installation cost, maintenance costs, replacement cost due to theft, etc.

To address these problems, a system 100 of FIG. 1A introduces a location-based solution permitting a user checking out or returning a shared vehicle and leaving the shared vehicle at their desired location, when a position of the parked shared vehicle is reported by combining multiple positioning methods, sources and inputs. In one embodiment, the system 100 can initiate a capture of an image of a shared vehicle at its parked location using an imaging capture device, such as a camera sensor of a user device. In one embodiment, the camera sensor is associated with the user of the shared vehicle. The captured image is processed either at the user's device or at the shared vehicle service provider's end to determine an image-based location of the shared vehicle. In one embodiment, the capture of the image is initiated or requested based on determining that a sensed location of the shared vehicle is determined by a location sensor of the shared vehicle having an inaccuracy above a threshold value. In one embodiment, the GPS receiver on the shared vehicle or the user's device is able to compute some accuracy level from the combination of the received GPS signals, and based on these received GPS signals, a mapping application can show a larger halo or sphere around the user position when the position is deemed not very accurate. In other words, if the GPS receiver that is equipped on the shared vehicle is unable to attain and/or report accurate GPS position coordinates, the capture of the image by the user device is initiated or requested due to the inaccuracy of the GPS receiver of the shared vehicle being above a predetermined threshold value.

The GPS system is a satellite navigation system that provides location information anywhere on or near the Earth's surface. It comprises a number of satellites in orbit above Earth. Each satellite continually transmits messages that include the time the message was transmitted, and the satellite position. On the ground the GPS unit receives these messages and, by comparing the time at which the message was received (on its internal clock) against the time which the message was transmitted, it works out how far away it is from each satellite. In order to calculate its location the GPS unit must receive messages (signals) from a minimum of four satellites. For example, if a GPS unit receives signals from a first and second satellite, upon receiving each signal the GPS unit calculates its distance from satellites one and two. If however, the GPS unit only receives a signal from the first satellite, then it can only determine that its location lies somewhere along a sphere of all locations that are the same distance from the first satellite. When the GPS unit receives signals from both the first and second satellites, it determines its distance from each satellite. Since two signals have been received the GPS unit can narrow the location down to those points where two individual distance spheres (i.e., one for each satellite) intersect. With the introduction of a third satellite the GPS unit further narrows the location down to two points. Only one of these points will be on the Earth's surface and therefore can be discarded by the GPS unit. With just three satellites the GPS unit can trilaterate the location. In practice, a fourth satellite is needed to improve accuracy (particularly altitude accuracy) due to errors in measuring the precise time at which each signal was received.

As a non-limiting example, the predetermined threshold value can set to ±5 meters for the latitude and longitude coordinates. If the GPS receiver of the shared vehicle is outside this predetermined threshold value, the capture of the image is initiated or requested. In one embodiment, the inaccuracy of the sensed location is determined to be above the threshold value by map matching the sensed location to an area where parking of the shared vehicle is not possible or restricted due to environmental obstacles, or because an area designated is restricted due to its proximity to a geographical feature (e.g., river or stream), or prohibited by a local authority or by the shared vehicle service. In another embodiment, the capture of the image can be initiated or requested based on a determination that a previously reported location of the shared vehicle has an inaccuracy above a threshold value. Thus, a previous user report or previous report from the shared vehicle could have already been submitted or reported to the shared vehicle service and the next user is requested to capture the image in order to determine a more accurate location.

In one embodiment, a user rents a shared vehicle, travels on or in the shared vehicle and arrives at the user's intended location. The user will then release (check-out or return) the shared vehicle at the conclusion of their trip. The user will use an application for initiating the release of the shared vehicle. The positioning module or location module equipped on the shared vehicle will attempt to report to the shared vehicle service a GPS position of the parked shared vehicle. However, in this embodiment the GPS position is highly inaccurate. The inaccuracy of the sensed GPS location exceeds a threshold. The application requests the user to capture an image of the shared vehicle with the user's device. Alternatively, user can use an AR feature that will assist the user in capturing an image of the shared vehicle by instructing the user to rotate the user device to capture more of the surroundings of the shared vehicle to assist with location determination. The system 100 uses the reported location based on the geo-tagged image or from a real-time detection feature of the AR.

In one embodiment, the system 100 can determine a location of the shared vehicle by fusing the image-based location with at least one other source of location data indicating a position of the shared vehicle to determine the location of the shared vehicle. In one embodiment, the image-based location of the shared vehicle is determined based on at least one of: a geo-tagged location associated with the image; object location data of one or other objects that are photo-identifiable in the image; and image depth data detected by an AR component of the device. In one embodiment, the validity of the image for determining the image-based location of the shared vehicle is based on a distance of the camera sensor from the shared vehicle, a presence of one or more other photo-identifiable objects that can be used to visually position the shared vehicle, or a combination thereof. In one embodiment, the geo-tagged location is determined using a location sensor (e.g., GPS receiver) of the user device at a time of the capture of the image. A position is reported by the camera sensor capturing the picture of the shared vehicle, i.e. picture geo-tagging using a user phone or user head mounted device. In one embodiment, a geo-tagged picture is an image which is associated with a geographical location. This is usually performed by assigning at least a latitude and longitude to the image, and optionally altitude, compass bearing and other fields may also be included. A camera sensor of a user device is typically provided with a built-in GPS receiver that is configured automatically to perform the geo-tagging.

In one embodiment, the system 100 can fuse or combine the image-based location with at least one other source of location data indicating a position of the shared vehicle to determine the location of the shared vehicle. In one embodiment, the at least one other source of location data indicating the position of the shared vehicle includes at least one of: first position data reported by the shared vehicle; and second position data determined using a sensor of the device other than the camera sensor.

In one embodiment, the visual positioning system is configured by the system 100 to use the camera sensor of the user device in conjunction with back-end data to analyze the surroundings of the shared vehicle and identify the location with greater accuracy. The visual positioning service is configured to access the camera of the user device to identify the surroundings in the field of view and compare it to a database of street view images in the region. The visual positioning service can be provided as an application on the user device, such as part of a map application installed on the user device. In one embodiment, the visual positioning system can provide detailed indoor and outdoor location positioning. The visual positioning system is ideal for densely populated urban areas that have environmental obstacles, such as building reflections, GPS drift, urban canyon effect, etc.

In one embodiment, the system 100 can facilitate use of shared vehicles by a shared vehicle service. The shared vehicle service can provide multiple users with multiple shared vehicles in a service area. The shared vehicles are rented for a temporary period of time beginning at a pick-up (check-in) location and returned at a drop-off (check-out) location. This temporary period of time is considered an exclusive personal usage of a shared vehicle by a user. Once the user returns the shared vehicle and checks-out the shared vehicle with the shared vehicle service, the shared vehicle is considered available for the next user for their temporary exclusive personal usage. The temporary period of time a user rents the shared vehicle can vary from only a few minutes, such as a relatively short bicycle ride over several city blocks. In other examples, the user can rent the shared vehicle for longer periods of time such as several hours, an entire day, or even multiple days. In one example, when the user has completed or finished their temporary exclusive personal usage of the shared vehicle, the user parks the vehicle in a geographic area which is part of the service area of the shared vehicle service. In one embodiment, the user is considered to have finished with the shared vehicle when the user has arrived at their intended location and has parked the shared vehicle and is ready to check out or release the shared vehicle back to the shared vehicle service. The user can park the shared vehicle along a street or road in a geographic area that includes a service area of the shared vehicle service. The parked shared vehicle can be on a sidewalk adjacent the street or road, or be parked on the actual road or street in a parking spot. In certain embodiments, the service area is considered to be any geographic area that the shared service provider has designated, such as an entire town or city or portion(s) of the town or city or multiple towns or cities in the geographic area.

In one embodiment, the user will obtain or capture an image of the parked shared vehicle with their personal device. In one embodiment, the user will obtain or capture the image from a vantage point away from the shared vehicle, such as between 3 and 8 meters. In one embodiment, the vantage point is a sufficient distance to capture an image of the shared vehicle as well as surroundings adjacent to the shared vehicle. In one example, the vantage point is a position or standpoint from which the shared vehicle is viewed by the user and the user will capture or obtain the image of the shared vehicle amid its surroundings. In one example, the shared vehicle is parked in front of a wall facade or store front along a sidewalk. Therefore, in one embodiment, the image will show the shared vehicle as well as at least a portion of the wall facade or store front. The surroundings around the shared vehicle can include a portion of the street or sidewalk on which the shared vehicle is parked, along with a portion of the backdrop behind the vehicle such as a building front, wall or facade, as well as street sign(s) or an address or name of a business that appears in the surroundings around the parked shared vehicle. In certain embodiments, the surroundings include other shared vehicle(s) that may be parked adjacent to the shared vehicle being checked out. The image is accessible by the shared vehicle service. In certain embodiments, the image or contents thereof are made available to a potential subsequent user of the shared vehicle. The contents of the image can include GPS location data, time stamp data, and other location or orientation data captured by the device and submitted to the shared service provider. This advantageously provides the subsequent user with helpful visual information to facilitate their locating or identification of the shared vehicle for their temporary exclusive personal usage.

In one embodiment, the system 100 can provide augmented reality (AR) features to assist with determining the location of the shared vehicle. In one embodiment, a visual inertial odometer is configured to be combined with camera tracking and motion sensor data, with which a real-time position of the user device can be recorded. In one embodiment, landscape and lighting can be determined in the image and the surfaces such as roads, sidewalks, floors, tables, walls, and ceilings can be detected.

In other embodiments, the system can include a motion tracking sensor enabled on the user device to observe inertial measurement unit (IMU) sensor data and feature points of the surrounding space to determine both the position and orientation of the device as per its movement. The user device can be enabled to detect horizontal surfaces and to detect lighting ambience of the device to enhance appearance and make the image accurate in real-time. In one embodiment, a magnetometer sensor can be provided in the user device that creates a Hall-effect sensor that detects the Earth's magnetic field along three perpendicular axes X, Y and Z. The Hall-effect sensor produces voltage which is proportional to the strength and polarity of the magnetic field along the axis each sensor is directed. The sensed voltage is converted to digital signal representing the magnetic field intensity. The magnetometer is enclosed in a small electronic chip that can incorporate another sensor (e.g., a built in accelerometer) that helps to correct the raw magnetic measurements using tilt information from the auxiliary sensor. In addition to general rotational information, the magnetometer is used for detecting the relative orientation of the user device relative to the Earth's magnetic north. The magnetometer can determine whether the user device is facing a certain direction, i.e., facing north west. Such features and sensors can be pre-installed on a user device or available as a downloadable application to the user device. In one embodiment, a positioning algorithm and a sensor fusion algorithm can be used for the location determination capabilities of the system 100.

In one embodiment, the system 100 can provide data for presenting a user interface on the user device to indicate a valid framing, a recommended framing, or a combination thereof for the capture of the image. In one embodiment, the system 100 can support the user by providing some useful hints or suggestions and provide direct feedback on how to capture a more useful or valuable image that is used for location analysis. In one embodiment, the user interface can suggest that the user be within a certain range of the parked shared vehicle, such as between 3 and 8 meters. If the user is beyond this suggested range, the user can be notified to move closer to the shared vehicle. In one embodiment, the system 100 can provide instructions to the user to capture some details from a facade immediately behind the shared vehicle to enable facade detection. In one embodiment, a store front facade that includes a business name or street number could be captured to assist with location determination.

In one embodiment, the system 100 can provide the user feedback by way of AR. The system 100 can perform real-time analysis of the image and the background and advise the user when it has enough information to determine a location of the shared vehicle. In one embodiment, the system 100 is configured to detect the shared vehicle, since the shared vehicle's geometry is known under all angles and lighting conditions by the shared vehicle service that supplied the shared vehicle. In one embodiment, the system 100 provides an AR view enabling real-time positioning using the visual positioning service technology mentioned herein. In one embodiment, visual AR features or clues can be generated on the user's device when the current field of view through the camera sensor is not providing sufficient details for location determination. These AR features or clues could be a directional arrow or pointing finger which easily show which direction the user should move around or to rotate the user device such that more of the surroundings adjacent the shared vehicle can be obtained. In one embodiment, the visual positioning service using the AR feature can display cues to either move around or rotate the device, e.g. to be able to see more of the facade of the building immediately behind the shared vehicle or more of the facade that the shared vehicle is leaning against. In other embodiments, an offline feature is provided that does not necessarily allow real-time facade recognition from street view images when the content is not available, but that could be uploaded as soon as connectivity allows, with a defined validity period. With the system 100 using AR to report a shared vehicle location, a very simplified and intuitive way for the user to complete the shared vehicle positioning task is provided. The system 100 can inform the user as soon as it has enough data to proceed, i.e. real-time feedback. Moreover, the system 100 provides a means for accurately locating shared vehicles, which results in more satisfied customer experiences and more usage/rentals of those shared vehicles, and which translates into more business for the shared vehicle service.

In one embodiment, the system 100 includes the visual positioning service which can obtain details from its street view server to determine the location of the shared vehicle. In one embodiment, when sufficient accuracy from satellite images is available, similar image recognition can be performed if there are visual cues or markings on the floor or on some other surface. In one embodiment, as soon as the visual positioning system has enough data, it can show an approval indicator such as a check mark, star, or a thumbs up icon which advises the users that the location shared vehicle has been obtained and the shared vehicle has been successfully checked out such that the user can leave the shared vehicle behind for the next user that can easily locate based on the successfully reported location. In one embodiment, the user device can be a mobile phone or mobile tablet of the user, while other embodiments include user head mounted devices such as smart glasses that are an optical head-mounted display designed in the shape of a pair of eyeglasses or eyewear.

In one embodiment, the system 100 can use position information of a second shared vehicle parked nearby the first shared vehicle. The known position of this second (or possibly third or more) shared vehicle can be used to fine tune the positioning of the shared vehicle. Shared vehicle services often encourage its customers to group the shared vehicles (e.g., bicycles, mopeds, scooters, etc.) when possible in order to limit the street disturbances or obstructions. In other embodiments, the shared vehicle service prefers to house the shared vehicles together at a station, and customers are encouraged to check out their shared vehicle at the station. In one embodiment, the user may "see" a second shared vehicle through the camera lens when attempting to take a picture of the first shared vehicle they are attempting to check out. The detection of this second shared vehicle can be used to fine tune the positioning of the first shared vehicle by retrieving the previously reported position of the second shared vehicle and analyzing the relative position to the first shared vehicle being checked out. In one embodiment, the system 100 will recognize the second shared vehicle as being within a specified distance from the current shared vehicle such as 3 meters on the right of the previously parked shared vehicle.

In one embodiment, the system 100 advantageously recognizes when the accuracy of the position of the shared vehicle is low or outside a specified threshold. The system 100 will not expend unnecessary computation time and various resources if accuracy of the location of the shared vehicle is adequate. In one embodiment, system 100 will not initiate the additional step of using a visual positioning system, AR or initiate a request for the user to capture an image of the shared vehicle, if the location of the shared vehicle is already accurately reported by an on-board GPS receiver. In another embodiment, the user can initiate the request only when the shared vehicle's reported position appears to be inaccurate to the user or if the system 100 determines that there is a risk for the reported position being inaccurate (e.g. if previous positions reported in this area were often off, or if the map data seems to indicate that there could be an unsuitable or restricted location for parking a shared vehicle (e.g., a bicycle near a river, lake, stream, etc.). In one embodiment, the system 100 can permit the user to manually indicate a location of the shared vehicle on a map when the system 100 is not able to properly position the shared vehicle. In one embodiment, the user can manually pin point the location of the shared vehicle at check out despite the risk of a user mistake or error in designating the location.

In one embodiment, the system 100 provides an improved location reporting mechanism that minimizes any user frustration in using the shared vehicle service. Moreover, with the user capturing an image of the shared vehicle at the time of check out, the user is also providing the shared vehicle service with evidence that the shared vehicle was returned safely and without any physical damage done to the shared vehicle during their trip. This is an incentive to the user to agree to capturing the image when prompted by the system 100.

In one embodiment, user equipment (UEs) 101 of a user and sensors in a shared vehicle 103 are collecting and reporting data (e.g., location data) to the system 100 to support the location-based solution according to the embodiments described herein. In this way, for instance, shared vehicles 103a-103n and/or vehicle users can use the system 100 for reporting location data to optimize or reduce the amount of cost and time for a user to check out a shared vehicle. With this data along with other data such as but not limited to public transport information, the system 100 (e.g., a routing platform 105) can compute candidate route options to a destination that includes one or more segments for the user to travel via one or more transport modes to pick up the vehicle and a segment for the user/vehicle to travel to the final destination. In this way, the system 100 can more precisely present to the user transport modes to travel to the pickup point then get to the destination in the vehicle. In one embodiment, the UEs 101 and the routing platform 105 have connectivity via a communication network 107.

In one embodiment, the shared vehicles 103a-103n are equipped with a location sensor (e.g., GPS) that reports the shared vehicles' parked position. In one embodiment, the UE 101 may be configured with one or more sensors 110a-110n (also collectively referred to as sensors 110) for determining the location data (including parking locations). By way of example, the sensors 110 may include location sensors (e.g., GPS), image capturing sensors, magnetometers, accelerometers, compass sensors, gyroscopes, depth sensors, altimeters, etc.

In one embodiment, after a journey is completed by a user (e.g., upon parking), the location data can be analyzed (e.g., by respective applications 111a-111n and/or the mapping platform 105 for storage in, for instance, a transportation database 113 and/or a geographic database 119) to detect parking locations where the shared vehicle remains after being checked out by the user and then becomes available for new reservations. Applications 111a-111n perform location functions independently or in conjunction with the mapping platform 105. In one embodiment, the mapping platform 105 and/or applications 111 receive a user request to check out the shared vehicle.

In one embodiment, timestamp information indicates at which time and which location the shared vehicle was parked is recorded as a record in the transportation database 113. In one embodiment, the record is then transmitted or uploaded to the mapping platform 105. In yet another embodiment, the record data may be maintained at the UE 101 device for local processing to determine vehicle parking information for transmission to the mapping platform 105 and/or other vehicles/UEs 101 (e.g., when operating in a peer-to-peer network architecture).

In one embodiment, the mapping platform 105 is configured to monitor the user and may present to the user a real-time status of the user, and/or an estimated or predicted status of the user to arrive at a shared vehicle parking location. The status information may also be associated with timestamp information and/or other contextual information (including parking) to store in the transportation database 113.

In another embodiment, the mapping platform 105 may present to the user information on parking areas and/or related information retrieved from the geographic database 119, while the user is traveling in or on the shared vehicle. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data with visual positioning service and information inferred from data collected from participating shared vehicles, or a combination thereof.

In one embodiment, the mapping platform 105 may also update the information as a map overlay that illustrates, for instance, a current location of the shared vehicles 103 equipped with a GPS receiver that is capable of submitting location information to the mapping platform 105.

As shown in FIG. 1A, the mapping platform 105 operates in connection with UEs 101 and shared vehicles 103 for managing a shared vehicle location. By way of example, the UEs 101 may be any mobile device, personal navigation device ("PND"), a portable navigation device, a cellular telephone, a mobile phone, a personal digital assistant ("PDA"), a wearable device such as eyewear, a camera, a computer and/or other device that can perform location based functions, i.e., digital location and map display. Also, the UEs 101 may be configured to access a communication network 107 by way of any known or still developing communication protocols. Via this communication network 107, the UE 101 may transmit location data as well as access various location based services for location of a parked shared vehicle.

Also, the UEs 101 may be configured with applications 111 for interacting with one or more content providers 115, services of the service platform 109, or a combination thereof. Per these services, the applications 111 of the UE 101 may acquire mapping information and other data associated with the parked location of the user and the shared vehicle. The content providers 115 and service platform 109 rely upon the gathering of user and vehicle data for executing the aforementioned services.

The UEs 101 may be configured with various sensors 110 such as GPS receivers for interacting with one or more satellites 117 to determine and locate the position of the shared vehicle and location of a user. In addition, the sensors 110 may gather motion data, light data, sound data, image data, temporal data and other data associated with UEs 101 and/or the vehicle 103 thereof.

By way of example, the mapping platform 105 may be implemented as a cloud based service, hosted solution or the like for performing the above described functions. Alternatively, the mapping platform 105 may be directly integrated for processing data generated and/or provided by service platform 109, content providers 115, and/or applications 111. Per this integration, the mapping platform 105 may perform location calculation based on user/vehicle location information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the shared vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
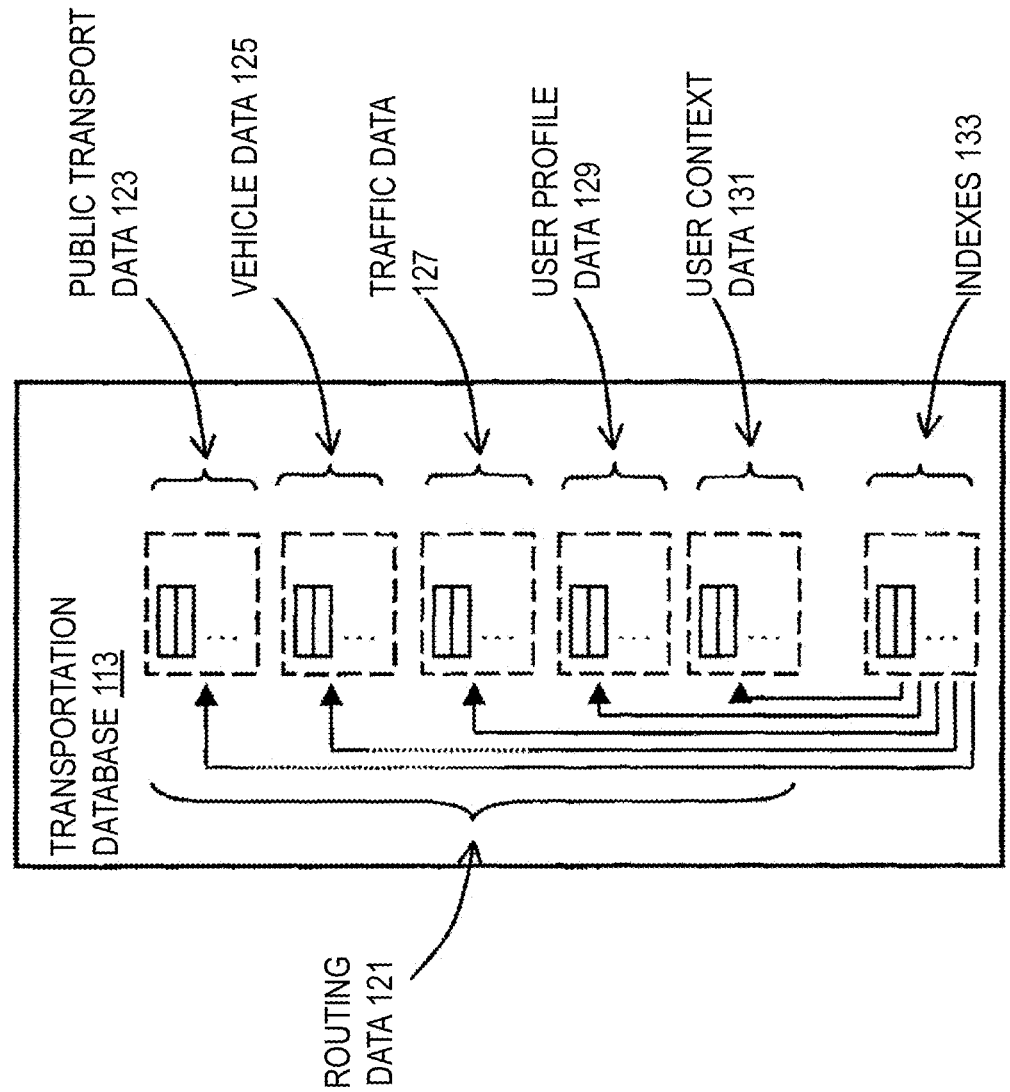
FIG. 1B is a diagram of a transportation database, according to one embodiment.

FIG. 1B is a diagram of the transportation database 113, according to one embodiment. In one embodiment, vehicle information and/or any other information used or generated by the system 100 with respect to shared vehicle routing data 121 stored in the transportation database 113 and associated with and/or linked to the geographic database 119 or data thereof.

In one embodiment, the routing data 121 include public transport data 123, vehicle data 125, traffic data 127, user profile data 129, user context data 131, indexes 133, etc. In one embodiment, the public transport data 123 can include any public transport data item used by the routing platform 105 including, but not limited to public transport type data, public transport schedule data, public transport route and stop data, real-time public transport trajectory data, etc.

retrieved from transit agencies, public transportation operators, etc. In one embodiment, the public transport data can be used in junction with the user profile data 129 and the user context data 131 for estimating an estimated arrival time for the user to arrive at a vehicle pickup/check out location and/or a creation of another vehicle reservation for another shared vehicle. In another embodiment, the traffic data 127 is further included for estimating the estimated arrival time for the user to arrive at a vehicle pickup/check in location and/or a creation of another vehicle reservation for another vehicle. The public transport data format may be in General Transit Feed Specification (GTFS), REST/XML, or other industry standards for publishing transportation network and schedule data. In one embodiment, the public transport can include but is not limited to on-demand services (e.g., taxis, shared vehicles, etc.) and fixed-route services such as city buses, trolleybuses, trams (or light rail) and passenger trains, rapid transit (metro/subway/underground, etc.), ferries, airlines, coaches, intercity rail, etc.

In one embodiment, the vehicle data 125 can include any vehicle data item used by the mapping platform 105 including, but not limited to vehicle type data, vehicle ownership data, vehicle route and step data, real-time parking instance data, timestamp information for the parking instance data, etc. for estimating the estimated arrival time for the user to arrive at a vehicle pickup or check in location, and/or a creation of another vehicle reservation for another shared vehicle. In another embodiment, the traffic data 127 is further included for estimating the estimated arrival time for the shared vehicle to arrive at the user destination.

In one embodiment, the traffic data 127 includes, but not limited to, travel speeds, congestions, detours, vehicle types and volumes, accidents, road conditions, road works, etc. on specific road segments.

In one embodiment, the user profile data 129 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/ records, criminal records, purchase records, financial data, activity records, employment records, insurance records, medical records, political and non-political affiliations, preferences (e.g., POIs), calendar data, driving history data, vehicle sharing data, etc. of the user.

In one embodiment, the user context data 131 includes, but not limited to, a destination of the user, a type of the destination of the user, a proximity of the user location to a vehicle pickup location or the destination, availability of an alternate destination for the user, a number of passengers accompanying the user, weather data in the vicinity of the user, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or location data).

Figure 1C:
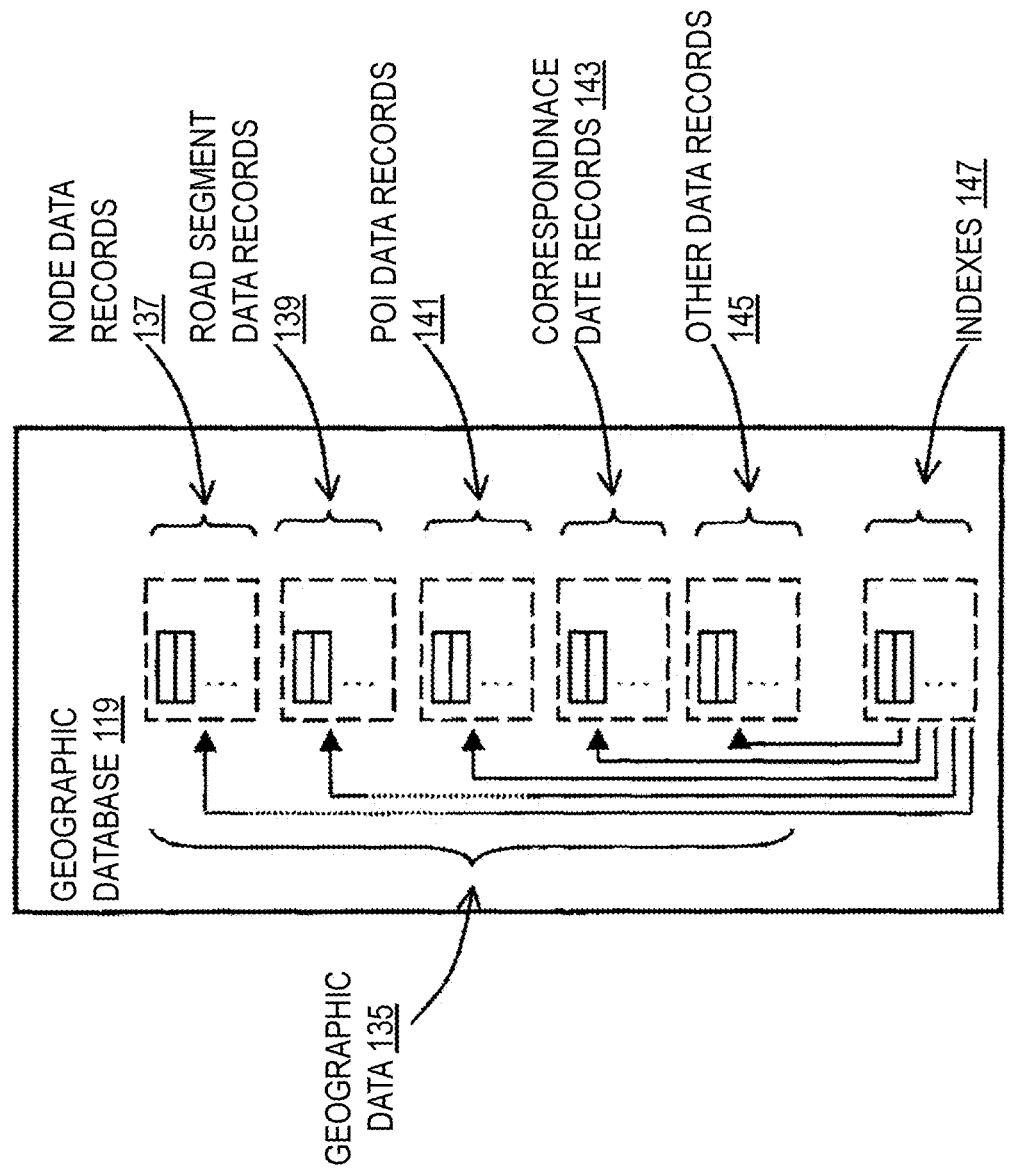
FIG. 1C is a diagram of a geographic database, according to one embodiment.

FIG. 1C is a diagram of a geographic database 119, according to one embodiment. In one embodiment, the geographic database 119 includes geographic data 135 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 137, road segment or link data records 139, POI data records 141, campaign data records 143, other records 145, and indexes 147, for example. More, fewer or different data records can be provided. In one embodiment, additional data records (not shown) can include cartographic ("carto") data records, routing data, and maneuver data. In one embodiment, the indexes 147 may improve the speed of data retrieval operations in the geographic database 105. In one embodiment, the indexes 147 may be used to quickly locate data without having to search every row in the geographic database 119 every time it is accessed. For example, in one embodiment, the indexes 147 can be a spatial index of the polygon points associated with stored feature polygons.

In exemplary embodiments, the road segment data records 139 are links or segments representing roads, streets, or paths, as can be used in the calculated route or recorded route information for determination of one or more personalized routes. The node data records 137 are end points corresponding to the respective links or segments of the road segment data records 139. The road link data records 139 and the node data records 137 represent a road network, such as used by vehicles, cars, and/or other entities. Alternatively, the geographic database 119 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 141. The geographic database 119 can also include data about places, such as cities, towns, or other communities, and other geographic features, such as bodies of water, mountain ranges, etc. Such place or feature data can be part of the POI data records 141 or can be associated with POIs or POI data records 141 (such as a data point used for displaying or representing a position of a city).

In one embodiment, the geographic database 119 can also include feature correspondence data records 143 for storing the identified feature correspondences (e.g., image-to-image correspondences, image-to-ground correspondences, etc.), location corrected images, location corrected features, location corrected camera models/poses, as well as other related data used or generated according to the various embodiments described herein. By way of example, the feature correspondence data records 143 can be associated with one or more of the node records 137, road segment records 139, and/or POI data records 141 to support localization or visual odometry based on the features stored therein and the corresponding estimated quality of the features. In this way, the correspondence data records 143 can also be associated with or used to classify the characteristics or metadata of the corresponding records 137, 139, and/or 141.

In one embodiment, the geographic database 119 can be maintained by the content provider (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 119 include high resolution or high definition (HD) mapping data that provide centimeter-level or better accuracy of map features. For example, the geographic database 119 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 119 is stored as a hierarchical or multi-level tile-based projection or structure. More specifically, in one embodiment, the geographic database 105 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide location-related functions and provide shared vehicle information. For example, the databases 113, 119 are accessible to the UE 101 directly or via the mapping platform 105. In another embodiments, the databases 113, 119 can be downloaded or stored on UE 101, such as in applications 111.

Figure 2:
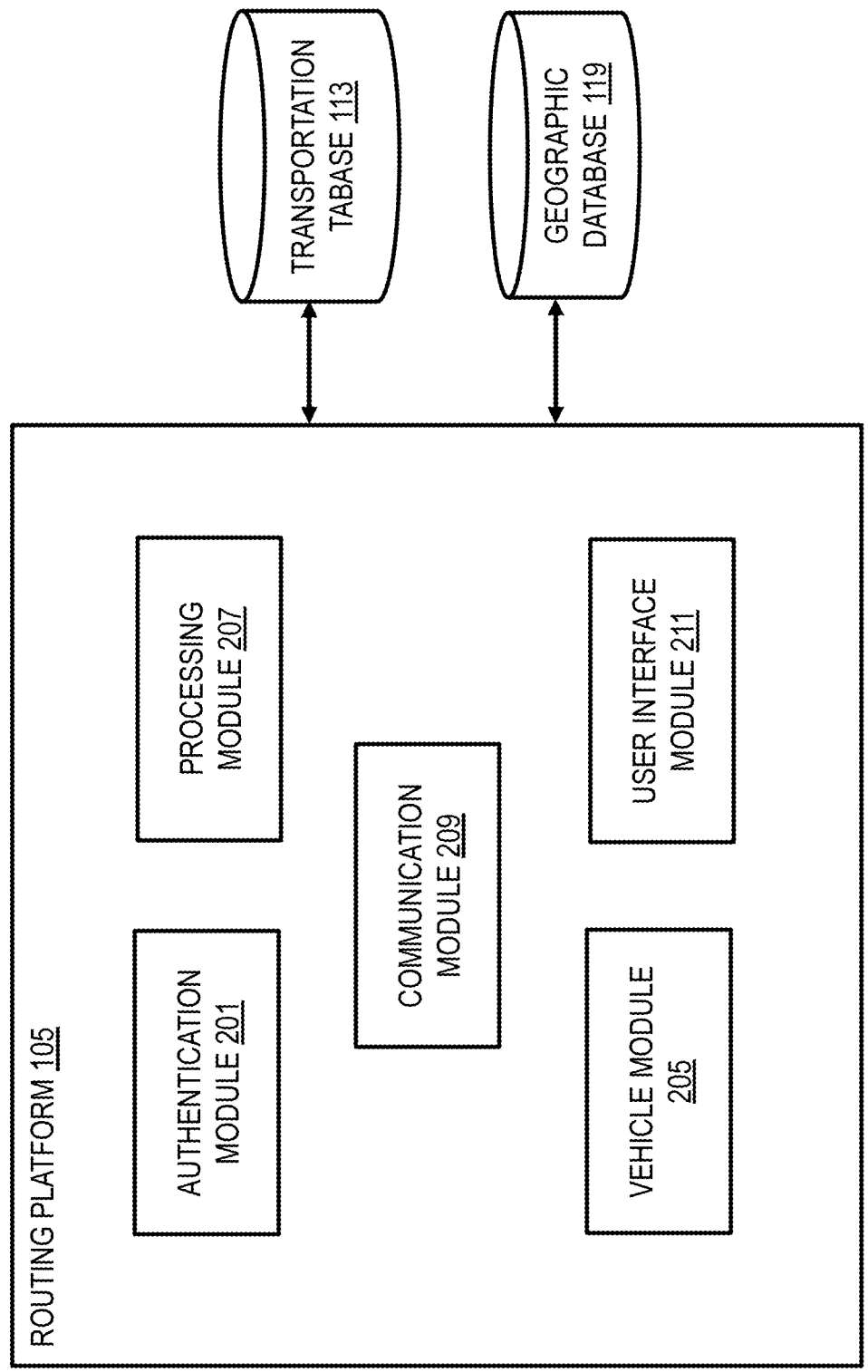
FIG. 2 is a diagram of the components of a mapping platform, according to one embodiment.

FIG. 2 is a diagram of the components of a mapping platform 105, according to one embodiment. By way of example, the mapping platform 105 includes one or more components for providing location information for a shared vehicle's parked location. It is contemplated that the functions of these components may be combined or performed by other components of equivalent functionality. In this embodiment, the mapping platform 105 includes an authentication module 201, a vehicle module 205, a processing module 207, a communication module 209, and a user interface module 211.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 209, which enables an interface between the application 111 and the mapping platform 105. In addition, the authentication module 201 may provide and/or validate access by the UE 101 to upload location-based information to the mapping platform 105. In one embodiment, the authentication module 201 may further be configured to support and/or validate the formation of profile by a provider of a service 109 or content provider 115, e.g., for supporting integration of the capabilities for shared vehicle location used with said providers 115 or services 109.

In one embodiment, the processing module 207 manages a vehicle location and can estimate the user movement based on predicted movement of the different mode of transport, such as cycling, car riding, scooter riding etc., in absence of real-time trajectory data, such as the user is traveling in a poor GPS coverage area. In one embodiment, the processing module 207 provides to the user instructions, and/or other information to the user to locate the vehicle.

It is further noted that the user interface module 211 may operate in connection with the communication module 209 to facilitate the exchange of real-time location information via the communication network 107 with respect to the services 109, content providers 115 and applications 111. Alternatively, the communication module 209 may facilitate transmission of the real-time location information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-211 may be implemented for operation by respective UEs 101 and/or vehicles 103 as a platform 105, cloud based service, or combination thereof.

Figure 3:
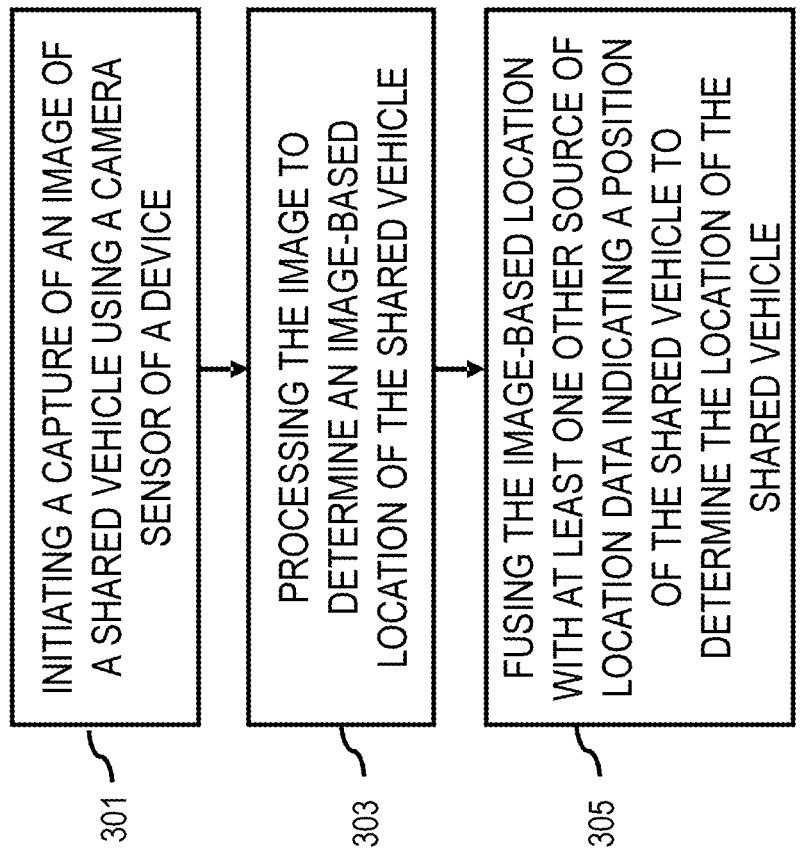
FIG. 3 is a flowchart of a process for determining a location of a shared vehicle based on fused location data, according to one embodiment.
Figure 9:
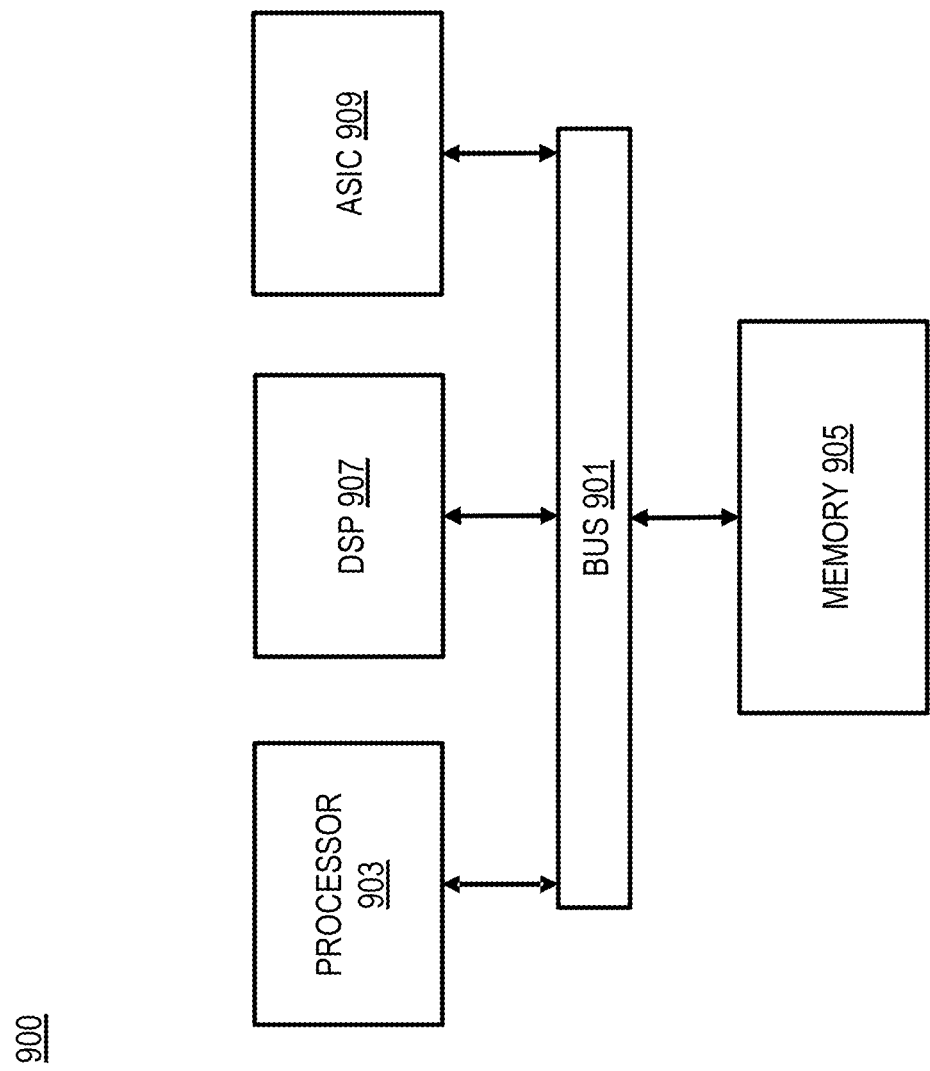
FIG. 9 is a diagram of a chip set that can be used to implement an embodiment of the invention.

FIG. 3 is a flowchart of a process for determining a location of a shared vehicle, according to one embodiment. In one embodiment, the mapping platform 105 performs the process 300 and is implemented in, for instance, a chip set including a processor and a memory as shown in FIG. 9. In addition or alternatively, all or a portion of the process 300 may be performed locally at the UE 101 and/or vehicle 103 (e.g., via the application 111 or another equivalent hardware and/or software component).

In FIG. 3, according to one embodiment, a method for determining a location of a shared vehicle is represented in a flowchart. The method includes step 301 that comprises initiating a capture of an image of a shared vehicle using a camera sensor of a device. In one embodiment, the device is associated with a user of the shared vehicle. In one embodiment, shared vehicle services do not allow checking out the shared vehicles on some given streets. In such instances, the map matching would return a valid position, but a notification coming from the shared vehicle service would point this location as being in a so-called "restricted" area. In an alternative embodiment, the capture of the image is initiated or requested based on determining that a previously reported location of the shared vehicle has an inaccuracy above a threshold value. In one embodiment, an AR view through the camera could surface the information that parking or check out of the vehicle is not allowed or permitted at a given location. In certain embodiments, an overlay could even show the limits in AR view.

In one embodiment, the data can be provided for presenting a user interface on the device to indicate a valid framing, a recommended framing, or a combination thereof for the capture of the image.

In step 303, the image is processed to determine an image-based location of the shared vehicle. In one embodiment, the image-based location of the shared vehicle is determined based on at least one of: a geo-tagged location associated with the image; object location data of one or other objects that are photo-identifiable in the image; and image depth data detected by an augmented reality component of the device. In one embodiment, the validity of the image for determining the image-based location of the shared vehicle is based on a distance of the camera sensor from the shared vehicle, a presence of one or more other photo-identifiable objects that can be used to visually position the shared vehicle, or a combination thereof. In one embodiment, real-time feedback can be provided on the device to indicate a validity of the image for determining the location of the shared vehicle in the image.

In step 305, the method also comprises fusing the image-based location with at least one other source of location data indicating a position of the shred vehicle to determine the location of the shared vehicle. In one embodiment, the at least one other source of location data indicating the position of the shared vehicle includes at least one of: first position data reported by the shared vehicle; and second position data determined using a sensor of the device other than the camera sensor. In one embodiment, the location of the shared vehicle that is determined is transmitted to a system of a provider of the shared vehicle to initiate a check-out of the shared vehicle.

In other embodiments, the method for determining the location of the shared vehicle can further include fusing the geo-tagged location with at least one other location data source to determine the location of the shared vehicle. In one embodiment, the at least one other location data source includes location data reported from the shared vehicle, location data reported from a visual positioning service, location data determined from an object detected in the image other than the shared vehicle, or combination thereof.

Figure 4:
FIG. 4 is an image captured by a user device which includes a shared vehicle at its parked location, according to one embodiment.

FIG. 4 is an example of an image captured by the user with the user equipment 101. The image includes the shared vehicle 401 in front of a wall facade 403 on a sidewalk 405. The shared vehicle 401 can be sitting upright with the assistance of a kickstand or left leaning against the wall facade 403. The image is an example of a location at which the user wishes to leave the shared vehicle 401 at the conclusion of their trip. If a successful GPS position can be reported by a GPS receiver equipped on the shared vehicle 401, the system will not request the user to capture any image and otherwise waste additional system processing resources such as accessing the visual positioning service or AR feature. The system will instruct the user to capture an image of the shared vehicle 401 with a camera sensor in the user equipment 101. The system 100 will processing the image to determine an image-based location of the shared vehicle 401. In one embodiment, the image-based location of the shared vehicle is determined based on at least one of: a geo-tagged location associated with the image; object location data of one or other objects that are photo-identifiable in the image; and image depth data detected by an augmented reality component of the device. The system 100 will then fuse the image-based location with at least one other source of location data indicating a position of the shared vehicle to determine the location of the shared vehicle 401. In one embodiment, the at least one other source of location data indicating the position of the shared vehicle includes at least one of: first position data reported by the shared vehicle; and second position data determined using a sensor of the device other than the camera sensor.

Figure 5:
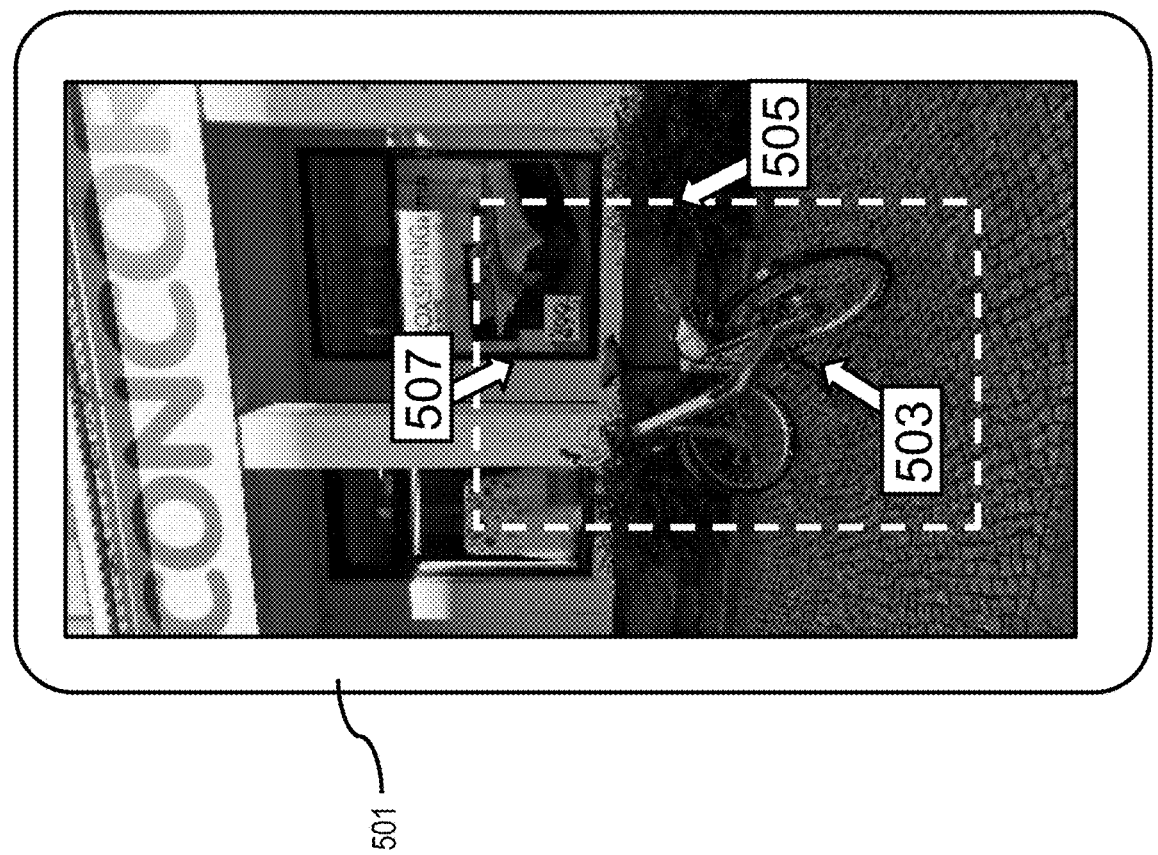
FIG. 5 is an image of a user device with a user interface depicting an image of the shared vehicle as viewed through the camera sensor, according to one embodiment.
Figure 6:
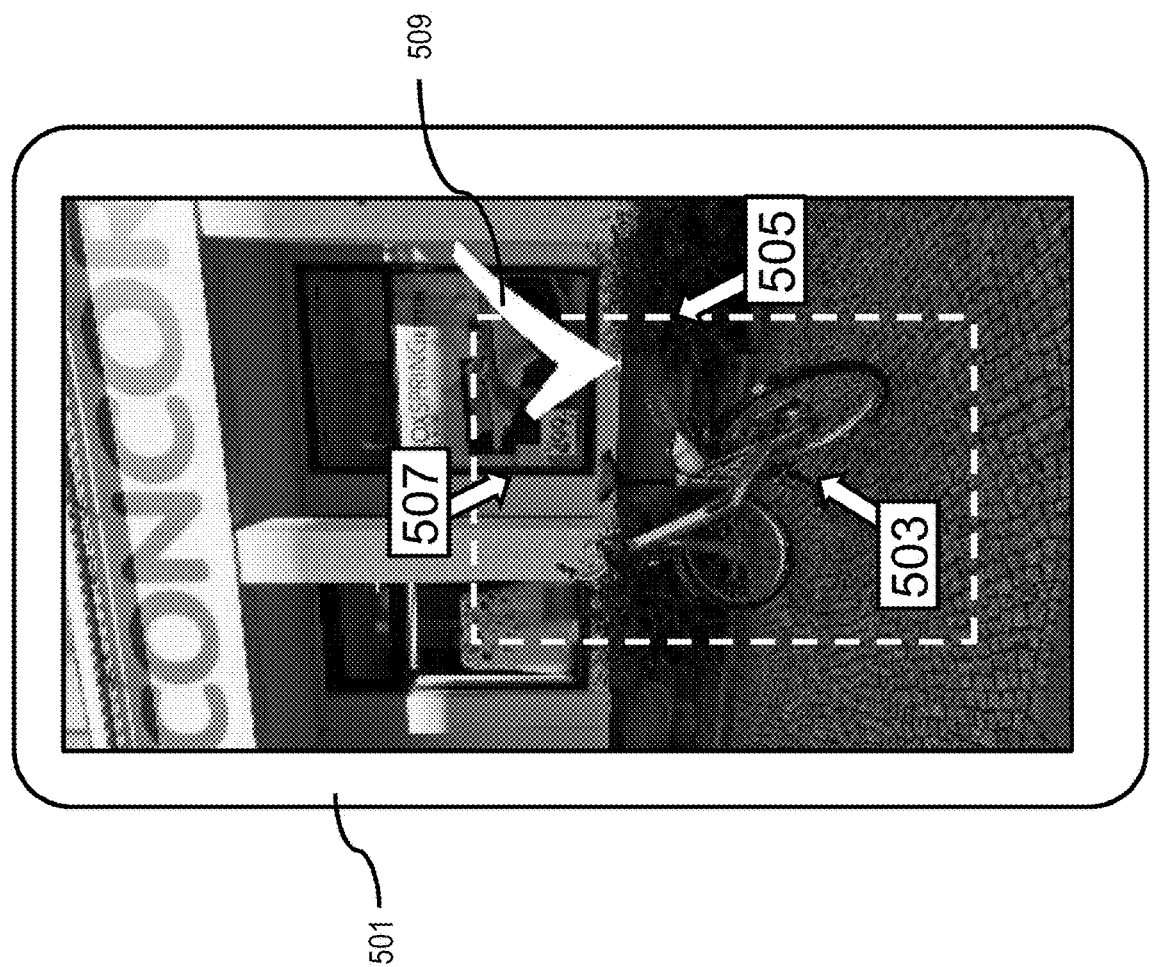
FIG. 6 is an image of a user device with a user interface depicting an image of the shared vehicle as viewed through the camera sensor together with an AR feature, according to one embodiment.

FIG. 5 is an example of user equipment 101 in the process of capturing an image of the shared vehicle 503 with the system 100 providing the user support or hints and direct feedback on how to capture a valuable image of the shared vehicle at the time the shared vehicle 503 is being returned after use. In this example, the system provides a frame 505 that includes the shared vehicle 503 together with sufficient details of the facade 507 to enable facade detection by way of the visual positioning service and its database of street view images to determine the location of the shared vehicle. FIG. 6 is substantially the same as FIG. 5, but includes an approval indicator 509 which is an example of the visual positioning system indicating that it has enough data. The visual positioning system in this embodiment shows an approval indicator 509 such as a check mark, star, or a thumbs up icon which advises the user that the location shared vehicle 503 has been obtained and the shared vehicle 503 has been successfully checked out such that the user can leave the shared vehicle 503.

Figure 7:
FIG. 7 is an image captured by a user device which includes multiple shared vehicles at adjacent parked locations, according to one embodiment.

FIG. 7 is an example of an image of two shared vehicles 701 and 703 that are parked near one another. In this embodiment, the system 100 can use position information of shared vehicle 703 that is parked nearby the shared vehicle 701 that the user is attempting to check out. The known position of shared vehicle 703 can be used to fine tune the positioning of the shared vehicle 701. Shared vehicle services often encourage its customers to group the shared vehicles (e.g., bicycles, mopeds, scooters, etc.) when possible in order to limit the street or sidewalk disturbances or obstructions. In this example, the user identifies a second shared vehicle 703 through the camera lens when attempting to take a picture of shared vehicle 701 they are attempting to check out. The detection of this second shared vehicle 703 can be used to fine tune the positioning of the first shared vehicle by retrieving the previously reported position of the second shared vehicle 703 and analyzing the relative position to the shared vehicle 701 being checked out. In this example, the system 100 will recognize the second shared vehicle 703 as being within a specified distance from shared vehicle 701 (e.g., shared vehicle 701 is less than 1 meter to the right of the previously parked shared vehicle 703.

The processes described herein for locating a shared vehicle's parked location may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
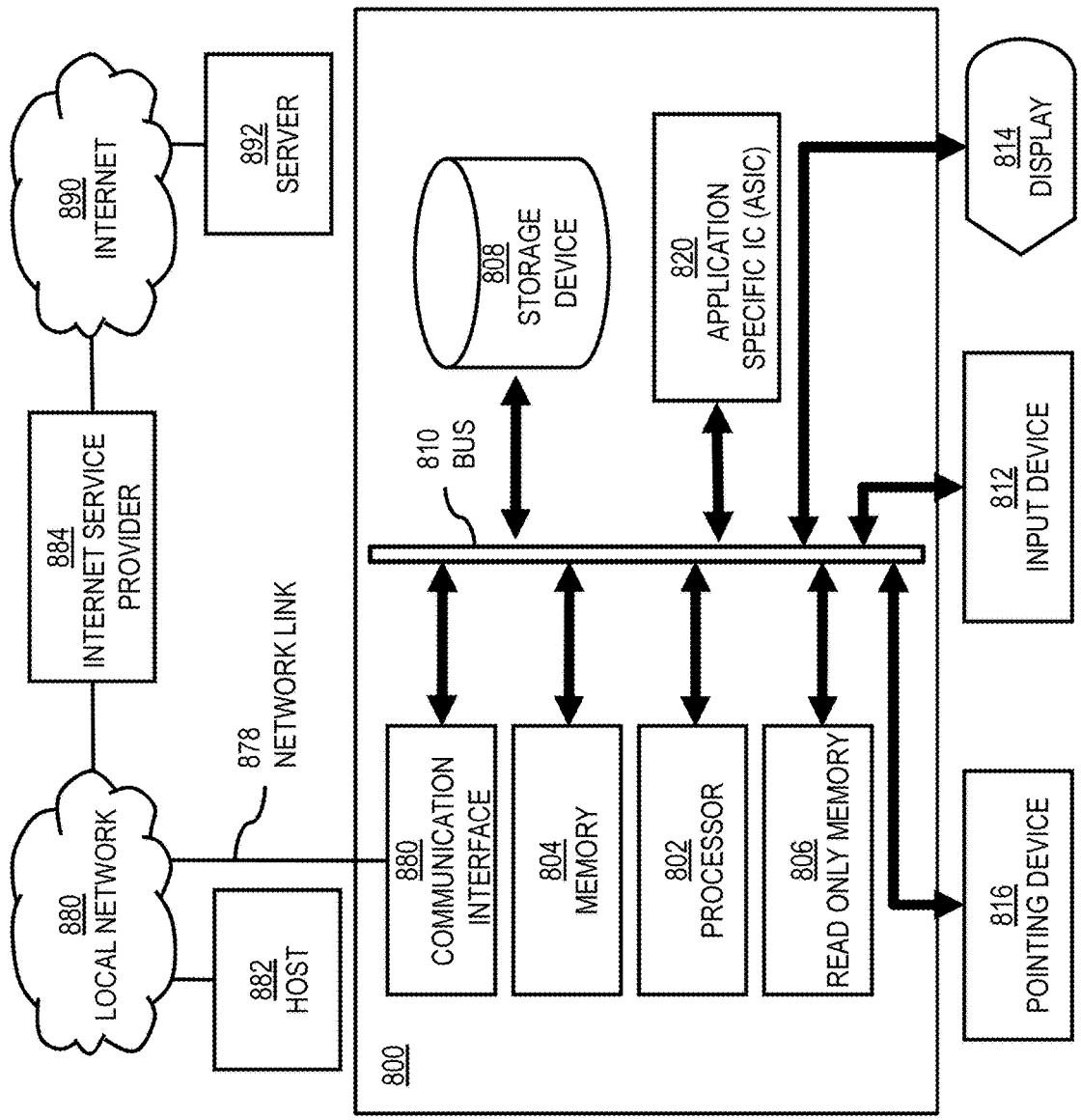
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine a parked location of a shared vehicle based on reported location data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of managing a vehicle reservation used in an intermodal route.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determining a parked location of a shared vehicle based on reported location data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining a parked location of a shared vehicle based on reported location data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining a parked location of a shared vehicle, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 to determine shared vehicle location through the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle location detection based on vehicle location information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining a parked location of a shared vehicle.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine a parked location of a shared vehicle. The memory 905 also stores the data associated with or generated by the execution of the inventive steps.

Figure 10:
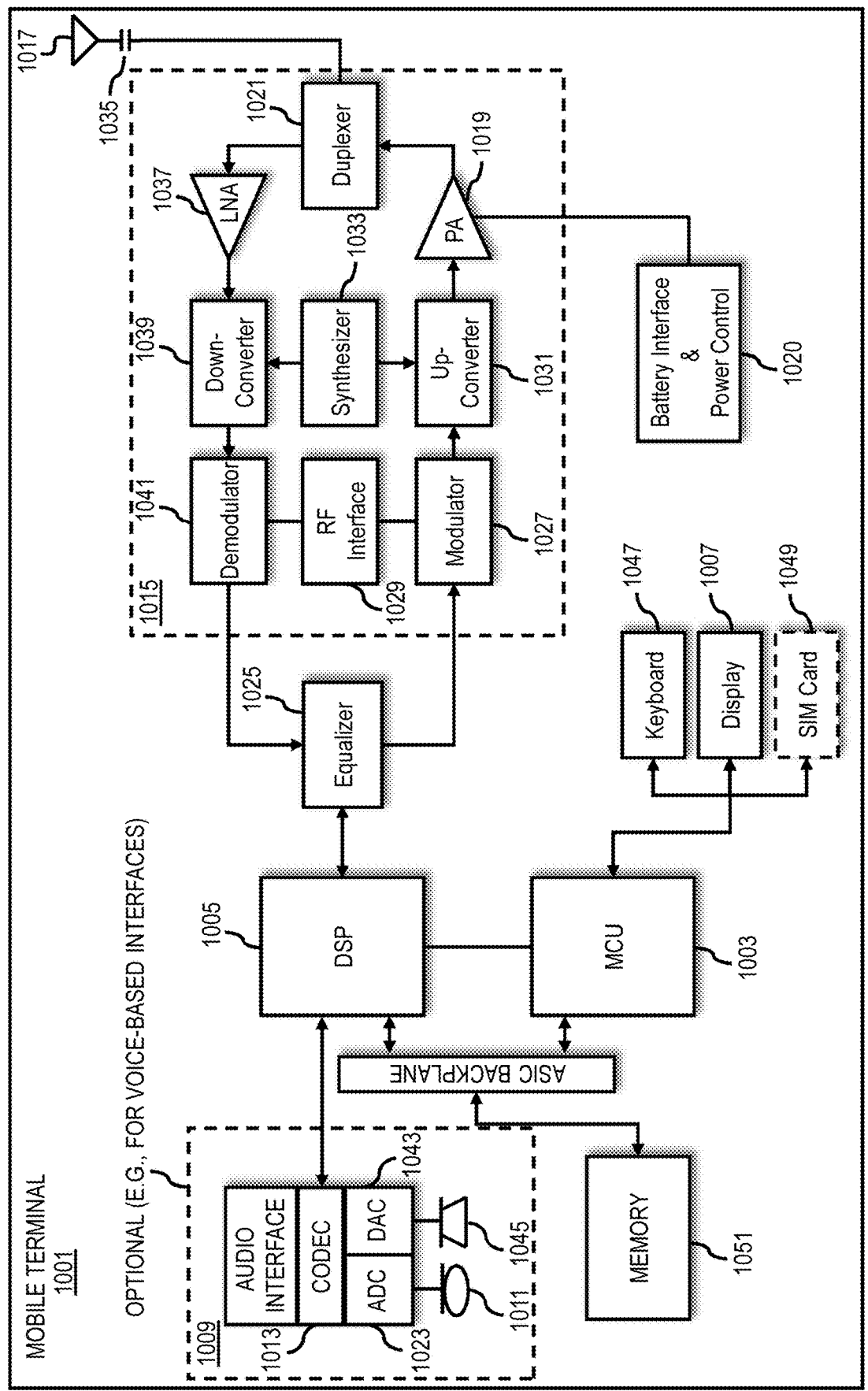
FIG. 10 is a diagram of a mobile terminal (e.g., mobile computer) that can be used to implement an embodiment of the invention.

FIG. 10 is a diagram of exemplary components of a mobile device (smartphones, tablet) for communications, which is capable of operating in the system of FIG. 1, according to one embodiment. In some embodiments, mobile terminal 1001, or a portion thereof, constitutes a means for performing one or more steps of determining a parked location of a shared vehicle. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of determining a parked location of a shared vehicle. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support determining a parked location of a shared vehicle is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to determine a parked location of a shared vehicle. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining a location of a shared vehicle based on fused location data, comprising:
   initiating a capture of an image of a shared vehicle using a camera sensor of a device;
   processing the image to determine an image-based location of the shared vehicle; and
   fusing the image-based location with at least one other source of location data indicating a position of the shared vehicle to determine the location of the shared vehicle,
   wherein the capture of the image is initiated or requested based on determining that a previously reported location of the shared vehicle or a sensed location of the shared vehicle, determined by a location sensor of the shared vehicle, has an inaccuracy above a threshold value.

2. The method of claim 1, wherein the image-based location of the shared vehicle is determined based on at least one of:
   a geo-tagged location associated with the image;
   object location data of one or other objects that are photo-identifiable in the image; and image depth data detected by an augmented reality component of the device.

3. The method of claim 1, wherein the at least one other source of location data indicating the position of the shared vehicle includes at least one of:
   first position data reported by the shared vehicle; and
   second position data determined using a sensor of the device other than the camera sensor.

4. The method of claim 1, further comprising:
   determining that the inaccuracy of the sensed location is above the threshold value by map matching the sensed location to an area where parking of the shared vehicle is not possible or restricted.

5. The method of claim 1, further comprising:
   providing data for presenting a user interface on the device to indicate a valid framing, a recommended framing, or a combination thereof for the capture of the image.

6. The method of claim 1, further comprising:
   providing data for presenting a user interface on the device to indicate a valid framing, a recommended framing, or a combination thereof for the capture of the image.

7. The method of claim 1, further comprising:
   providing real-time feedback on the device to indicate a validity of the image for determining the image-based location of the shared vehicle.

8. The method of claim 7,
   wherein the validity of the image for determining the image-based location of the shared vehicle is based on a distance of the camera sensor from the shared vehicle, a presence of one or more other photo-identifiable objects that can be used to visually position the shared vehicle, or a combination thereof, and
   wherein the determined location of the shared vehicle is transmitted to a system of a provider of the shared vehicle to initiate a check out of the shared vehicle.

9. An apparatus for determining a location of a shared vehicle based on fused location data comprising:
   at least one processor; and
   at least one memory including computer program code for one or more programs, the at least one memory and the computer program code configured to, with the at least one processor, cause the apparatus to perform at least the following,
   initiate a capture of an image of a shared vehicle using a camera sensor of a device;
   process the image to determine an image-based location of the shared vehicle; and
   fuse the image-based location with at least one other source of location data indicating a position of the shared vehicle to determine the location of the shared vehicle;
   wherein the capture of the image is initiated or requested based on determining that a previously reported location of the shared vehicle or a sensed location of the shared vehicle, determined by a location sensor of the shared vehicle, has an inaccuracy above a threshold value.

10. The apparatus of claim 9, wherein the image-based location of the shared vehicle is determined based on at least one of:
    a geo-tagged location associated with the image;
    object location data of one or other objects that are photo-identifiable in the image; and image depth data detected by an augmented reality component of the device.

11. The apparatus of claim 9, wherein the at least one other source of location data indicating the position of the shared vehicle includes at least one of:
    first position data reported by the shared vehicle; and
    second position data determined using a sensor of the device other than the camera sensor.

12. The apparatus of claim 9, wherein the apparatus is further caused to:

determine that the inaccuracy of the sensed location is above the threshold value by map matching the sensed location to an area where parking of the shared vehicle is not possible or restricted.

13. A method for facilitating use of shared vehicles provided by a shared vehicle service, wherein said shared vehicle service provides a plurality of users with a plurality of shared vehicles, wherein each of said shared vehicles is available for temporary exclusive personal usage by any of said users, whereupon after a temporary exclusive personal usage of a particular one of said plurality of shared vehicles by any of said users the particular shared vehicle is available for temporary exclusive personal usage by another of said users, the method comprising:

obtaining an image of a shared vehicle from one of the plurality of users who has finished a usage of the shared vehicle and parked the shared vehicle along a road in a geographic area that includes a service area of the shared vehicle service, wherein the image was obtained with a device of said one of the plurality of users, wherein the image was obtained from a vantage point away from the shared vehicle and wherein the image shows the shared vehicle amid surroundings of the shared vehicle; and making the image or contents thereof available to a potential subsequent user of the shared vehicle to facilitate locating or identifying the shared vehicle, where the obtained image is initiated or requested based on determining that a previously reported location of the shared vehicle or a sensed location of the shared vehicle, determined by a location sensor of the shared vehicle, has an inaccuracy above a threshold value.

14. The method of claim 13, further comprising:
providing data for presenting a user interface on the device to indicate a valid framing, a recommended framing, or a combination thereof for the obtaining of the image.

15. The method of claim 13, further comprising:
providing real-time feedback on the device to indicate a validity of the image for determining a location of the shared vehicle.

16. The method of claim 13, wherein the validity of the image is based on a distance of the device from the shared vehicle, a presence of one or more other photo-identifiable objects in the surroundings that can be used to visually position the shared vehicle, or a combination thereof.

17. A method for determining a location of a shared vehicle based on fused location data, comprising:

initiating a capture of an image of a shared vehicle using a camera sensor of a device;

processing the image to determine an image-based location of the shared vehicle;

fusing the image-based location with at least one other source of location data indicating a position of the shared vehicle to determine the location of the shared vehicle;

providing real-time feedback on the device to indicate a validity of the image for determining the image-based location of the shared vehicle, wherein the validity of the image for determining the image-based location of the shared vehicle is based on a distance of the camera sensor from the shared vehicle, a presence of one or more other photo-identifiable objects that can be used to visually position the shared vehicle, or a combination thereof, and wherein the determined location of the shared vehicle is transmitted to a system of a provider of the shared vehicle to initiate a check out of the shared vehicle.

\* \* \* \* \*